(12) United States Patent
Jansen

(10) Patent No.: US 10,661,321 B2
(45) Date of Patent: May 26, 2020

(54) ACCESS DEVICE FOR A FLUID TANK

(71) Applicant: B+BTec International BV, Zevenbergen (NL)

(72) Inventor: Francis Jansen, Zevenbergen (NL)

(73) Assignee: B+BTEC INTERNATIONAL BV, AH Zevenbergen (NL)

(*) Notice: Subject to any disclaimer, the term of this patent is extended or adjusted under 35 U.S.C. 154(b) by 0 days.

(21) Appl. No.: 16/100,636

(22) Filed: Aug. 10, 2018

(65) Prior Publication Data
US 2019/0054512 A1 Feb. 21, 2019

(30) Foreign Application Priority Data
Aug. 16, 2017 (DE) .......... 10 2017 007 700

(51) Int. Cl.
| | | |
|---|---|---|
| *B09B 3/00* | (2006.01) | |
| *B23G 5/20* | (2006.01) | |
| *B23B 51/04* | (2006.01) | |
| *F16L 41/04* | (2006.01) | |
| *B63B 25/08* | (2006.01) | |
| *B63C 7/00* | (2006.01) | |
| *B23B 51/08* | (2006.01) | |
| *B23G 5/06* | (2006.01) | |

(52) U.S. Cl.
CPC ........ *B09B 3/0058* (2013.01); *B23B 51/0406* (2013.01); *B23G 5/20* (2013.01); *B63B 25/082* (2013.01); *B63C 7/006* (2013.01); *F16L 41/04* (2013.01); *B09B 2220/10* (2013.01); *B23B 51/08* (2013.01); *B23G 5/06* (2013.01)

(58) Field of Classification Search
CPC . B23B 51/0406; B23B 51/08; B23B 2215/72; B23B 2260/142; B28D 1/041; B23G 5/20; B23G 2200/12; B23G 2200/143; B63C 7/006; G16L 41/04; F16L 41/04; B09B 3/0058
USPC ........ 470/87, 88, 89, 90, 91, 93, 94, 96, 97, 470/105
See application file for complete search history.

(56) References Cited

U.S. PATENT DOCUMENTS

| | | |
|---|---|---|
| 3,831,387 A | 8/1974 | Rolleman |
| 4,466,762 A * | 8/1984 | Menke ............... B23G 5/06 408/215 |
| 5,546,979 A | 8/1996 | Clark et al. |
| 5,704,383 A | 1/1998 | Kammeraad et al. |
| 5,775,390 A | 7/1998 | Mohn |
| 6,293,163 B1 | 9/2001 | Johnston et al. |

(Continued)

FOREIGN PATENT DOCUMENTS

| | | |
|---|---|---|
| DE | 42 43 966 C1 | 5/1994 |
| DE | 698 04 266 T2 | 10/2002 |

(Continued)

OTHER PUBLICATIONS

Machine Translation, DE 69804266, Dumont P. et al., Apr. 25, 2002. (Year: 2002).*

*Primary Examiner* — Eric A. Gates
*Assistant Examiner* — Chwen-Wei Su
(74) *Attorney, Agent, or Firm* — McGlew and Tuttle, P.C.

(57) ABSTRACT

An access device is provided for access to a fluid tank, especially a fluid tank of a ship. The access device includes a drill, a thread-forming unit, a hollow body with an external thread and a connection plate. The hollow body is provided with a valve.

20 Claims, 1 Drawing Sheet

(56) References Cited

U.S. PATENT DOCUMENTS

| | | | | |
|---|---|---|---|---|
| 7,552,742 | B2* | 6/2009 | Dole | F16L 41/06 |
| | | | | 137/238 |
| 9,579,732 | B2* | 2/2017 | Piller | B23B 51/0406 |
| 10,184,605 | B2* | 1/2019 | Reid | F16L 41/06 |

FOREIGN PATENT DOCUMENTS

| | | | | |
|---|---|---|---|---|
| DE | 601 25 361 T2 | 10/2007 | | |
| FR | 1202693 A | * | 1/1960 | B23G 5/06 |
| FR | 2787048 A1 | * | 6/2000 | B21H 3/08 |
| GB | 2039655 A | * | 8/1980 | F16L 41/04 |

\* cited by examiner

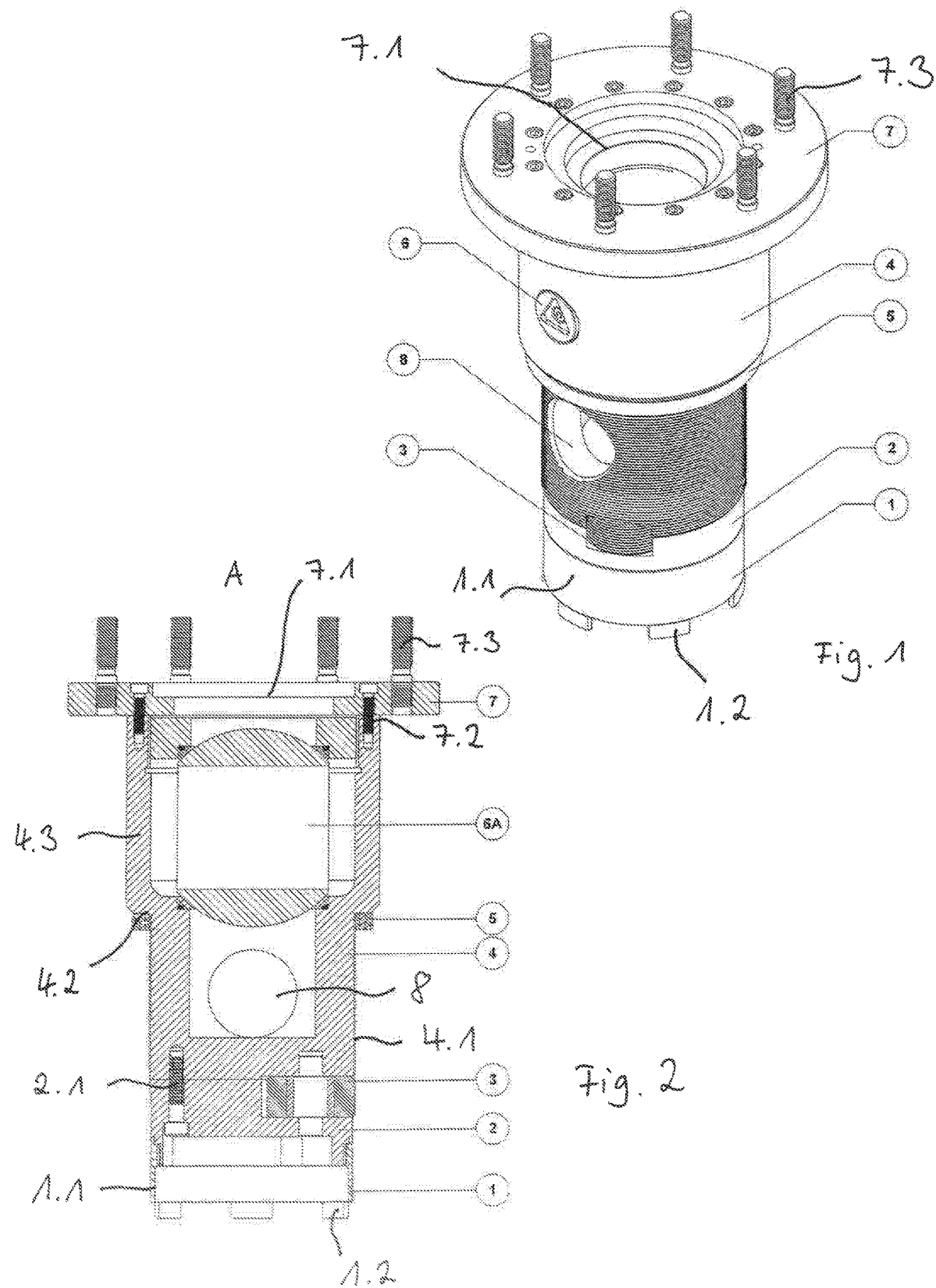

ACCESS DEVICE FOR A FLUID TANK

CROSS REFERENCE TO RELATED APPLICATIONS

This application claims the benefit of priority under 35 U.S.C. § 119 of German Application 10 2017 007 700.2, filed Aug. 16, 2017, the entire contents of which are incorporated herein by reference.

TECHNICAL FIELD

The present invention pertains to an access device for a fluid tank, especially of a ship.

BACKGROUND

In the case of partially or completely sunken ships, due, for example, to an accident, there is a risk that liquid fuel for driving the ship or liquid cargo, especially crude oil, will escape and pollute the water bodies and hence the environment.

It is, therefore, important to pump out both the fuel and the liquid cargo, such as crude oil, which is hazardous to water bodies, from such ships. There frequently is no possibility of doing this via the normal connections of such a ship. Therefore, access must then be created to the corresponding tank—for the fuel or the liquid cargo—in another manner.

SUMMARY OF THE INVENTION

A basic object of the present invention is therefore to create an access device for a fluid tank, i.e., especially a liquid tank, of this type, which makes it possible to gain access to such a tank regardless of the usual connections (inlets and outlets) thereof.

This object is accomplished according to the present invention in case of an access device of the type mentioned in the introduction by a drill, by a thread-forming unit, by a hollow body provided with a valve, which hollow body has an external thread, and by a connection plate.

The present invention may also be used in case of fluid tanks, especially liquid tanks other than a tank in a ship, even though the latter is the preferred field of use.

Said components are embodied together in the device according to the present invention and form this as one unit. An access to a tank, especially of a sunken ship, can be created by this access device at a location other than the usual connection elements (inlets/outlets) by the entire device with its connection plate, which is provided with suitable connection elements, being connected to drill pipes, as they are present on a drill drive, especially of a hydraulic drilling machine or hydraulic drill pipes, and by a hole then being drilled into the tank wall by means of the drill. A thread, into which the hollow body is then screwed with the external thread thereof, is cut by the thread-forming unit into the edge of the tank wall, which edge surrounds the drilled hole. The contents of the tank can then be pumped out by means of a pump via an inlet of the access device. This inlet is now located within the tank, with a hose or pipe system connected to the connection plate instead of to the removed drilling device.

Accordingly, the above-mentioned parts are arranged one after another in the order mentioned, the drill being arranged at the distal end of the device and the connection plate at the proximal end.

Areas facing away from the user, operator or worker and facing the work area are designated as being "distal" and areas of the device facing the operator or worker and facing away from the work area are designated as being "proximal."

In a preferred embodiment, the drill is a diamond drill, which has especially a pipe provided with diamond segments. The pipe's jacket wall has a cylindrical shape surrounds an empty cavity and is provided with the diamond segments at the end face of its jacket wall by which the pipe is formed. The pipe thus drills an outlet opening for the oil in the wall of the tank (after fixing the device to the tank). The diamond segments are arranged at the distal end of the pipe. They consist of steel elements, which are provided with diamond splitter at their front. The pipe also consists of steel.

The thread-forming unit is preferably formed by having on the circumference thread-forming wheels, which are preferably arranged uniformly over the circumference of a support portion of the thread-forming unit. The number of thread-forming wheels is preferably between two and four, and especially three thread-forming wheels are provided.

Provisions are made according to a preferred embodiment for the thread-forming unit to be a thread-cutting unit or thread-rolling unit and for the thread-forming wheels to be thread rollers or thread-cutting wheels. While thread-cutting is a machining process for producing the thread, thread rolling is a non-cutting shaping process. The latter makes it possible to work with lower forces than in the former case.

In another extremely preferred embodiment of the invention, it is provided that the radial distance of the outer contour of an effective region of the thread forming device from a central axis of the device corresponds to the radius of the external thread of the hollow body. It is thereby achieved that the region of the hollow body, which proximally directly follows the thread forming device and/or the thread forming wheels, and which is provided with an external thread, directly engages the thread formed by the thread forming device when the device is further turned or screwed in by means of the drilling machine, which engages at the connection plate, and the device can accordingly be screwed further into the thread.

In a further preferred embodiment, it is provided that the hollow body has a shoulder with a seal. By means of the shoulder, the diameter of the hollow body in a proximal region is radially increased in relation to its distal region having the external thread so that the seal rests distally on the shoulder and that, by screwing the hollow body into the housing wall of the tank up to the seal and finally by compressing the seal, a reliable sealing of the bore hole in the tank and thus of the interior of the tank from the exterior is accomplished.

In order to enable pumping off the liquid after introducing and fixing the access device according to the invention in and to the tank, the hollow body is provided with a ball valve in an additional preferred embodiment. This can be brought from a closed valve state, which was originally given when the hole is formed into the housing wall and when the access device is screwed in, to an opened valve state by means of pivoting a valve body of the valve around a valve axis which is perpendicular to the main longitudinal axis of the access device, thereby providing a connection between the interior of the tank and the exterior and, in particular, a hose or pipe which is connected to the connection plate for pumping off the liquid in the tank.

In a further preferred embodiment, it is provided that the hollow body has a lateral opening as a fluid inlet, the lateral opening being arranged distally to a shoulder of the hollow body.

In order to operate the valve in the described manner, the latter preferably has an operating element on the outer side of the jacket wall of the hollow body, the operating element preferably being a triangular wrench key receiver, but also be designable in several polygonal ways, for example as a square or hexagonal wrench key receiver.

The use of the access device according to the invention for a fluid tank, in particular a liquid tank, preferably takes place as follows:

The device is connected with its proximal connection plate to a drill drive, in particular a hydraulic drilling machine, by means of suitable connecting elements, such as screws. The device is then moved against the wall of the tank, for example of a ship, with the distal end of the drill and its effective drilling segments. Then, the device is put into a drilling rotation by means of axial pressure, whereby a hole is cut into the wall of the tank. Upon further turning and axial movement, the thread forming unit, which directly follows the drill, engages the edge of the wall of the tank surrounding the drilling hole and cuts a thread into the wall. Preferably, in case of a thread rolling unit, by means of forming the wall of the tank surrounding the drilling hole. Upon further turning the device according to the invention by means of a hydraulic drilling machine, the device engages the external thread of the hollow body and is screwed into the drilling hole, until the preferably provided seal reaches the outer wall region of the tank surrounding the drilling hole and is compressed there forming a seal.

Subsequently, by means of the control element of the valve, for example the mentioned key wrench receiver, the valve is pivoted from its closed valve state to an opened valve state, for example by a diver who engages the control element of the access device with a suitable tool. Subsequently, the liquid can then be pumped out of the tank via the access device and, if necessary, a tube or a pipe, which is proximally combined with and/or integrated in the drill drive by means of a pump. In case of the drill drive and the suction tube or pipe being separate and in order to open the valve, the drill drive is removed and a tube or pipe conduit is tightly connected to the connection plate.

Further advantages and features of the present invention appear from the claims and from the following description, in which an exemplary embodiment of the present invention is explained in detail with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a perspective view of a preferred embodiment of the device according to the present invention; and FIG. 2 is a longitudinal sectional view through the preferred embodiment of the device according to the present invention according to FIG. 1.

DESCRIPTION OF PREFERRED EMBODIMENTS

Referring to the drawings, the device according to the present invention for creating an access to a fluid tank, especially of a partially or completely sunken ship, has at its distal end a drill 1 in the form of a diamond drill with axially extending diamond segments 1.2 arranged on the circumference. The diamond segments 1.2 may consist, just as the pipe 1.1, of special steel and are provided with diamond elements on their free end face facing away from the pipe 1.1. A thread-rolling unit 2 adjoins proximally to the drill 1 in the exemplary embodiment shown.

The thread-rolling unit 2 has, distributed uniformly over its circumference, thread-rolling wheels 3. The outer contour of the thread-rolling wheels 3, extends slightly over the radial outer contour of the thread-rolling unit 2 and slightly over that of the drill 1. The thread-rolling unit 2 is welded to the drill 1, i.e., it is connected by welding. A hollow body 4, which has an external thread 4.1 in an area located distally from a shoulder 4.2, adjoins likewise proximally to the thread-rolling unit 2. The thread-rolling unit 2 and the hollow body 4 are connected to one another by means of a plurality of axially directed bolts 2.1 distributed uniformly over the circumference.

The radial outer contour of the rolling unit 2 in its active area, i.e., in the area of the thread-rolling wheels 3, and hence the radial outer contour of the thread-rolling wheels 3 correspond to the radial outer contour or to the radial distance of the thread 4.1 of the hollow body 4 from the central longitudinal axis A.

The hollow body 4 is provided with a fluid inlet 8 in the area of the thread 4.1. The hollow body 4 expands over the shoulder 4.2 arranged proximally to the thread 4.1 to a radius or diameter that is larger than the radius or diameter of its section in the area of the thread 4.1. An elastic seal 5 is arranged at the proximal end of the thread 4.1 distally from the shoulder 4.2. A valve 6A in the form of a ball valve, which is pivotable about an axis directed at right angles to the longitudinal axis A of the device, is arranged within the expanded area 4.3 of the hollow body, so that the ball valve can block or release a fluid path between the fluid inlet 8 and an opening 7.1 provided proximally to the ball valve 6A. To operate the ball valve 6A, the latter is provided with a wrench mount 6, here in the form of a triangular wrench mount, towards the outer side of the device. The wrench mount may also be configured, instead, in the form of a square or polygon or in another manner.

A connection plate, which is connected to the hollow body 4 by means of bolts distributed uniformly over the circumference by meshing with the wall of the hollow body 4, is provided proximally to the hollow body 4. The connection plate 7 is used, on the one hand, to connect the device to a drill drive, preferably to a hydraulic drill drive (not shown), and, on the other hand, for connection to a suction hose (likewise not shown) for suctioning out the fluid, especially a liquid, such as oil, from the tank of a ship, through the device according to the present invention with the valve 6A opened. Connecting bolts 7.3, likewise distributed uniformly over the circumference, protrude for this proximally from the connection plate 7.

The access device according to the present invention for a fluid tank, especially a liquid tank, such as an oil tank of a ship, is used and functions as follows:

The device according to the present invention is first connected via the bolts 7.3 of its connection plate 7 to a drill drive, preferably of a hydraulic drilling machine, and is attached by means of this drill drive with the drill 1 and especially with the diamond segments 1.2 thereof to the outer side of the tank or of the hull in the area of a tank of the ship and is set into rotary motion by the drill drive. The drill 1 or the diamond segments 1.2 thereof cut a hole into the wall of the tank or of the hull. During further feed of the device by the drill pipes, the cutting device 2 with its thread-cutting wheels 3 meshes with the hole created and especially with the edge of the hole in the tank or ship wall and cut a thread into the circumferential edge of the tank wall by means of the drill drive during further rotation of the device. After cutting, shaping of the thread with rollers and further feed of the device, the thread 4.1 of the hollow body 4 meshes with the thread formed in the tank wall and is screwed into this until the outer side of the tank wall is distally in contact with the seal 5 and compresses the latter tightly. The valve 6A is closed during the entire above-described procedure and hence it is in the position shown in FIG. 2. After inserting the device up to the seal 5 into the interior of the tank in the above-described manner, the inlet opening 8 is located within the tank. The drill drive is now removed and a suction hose is connected to the device with the connection plate 7, likewise via the bolts 7.3. The valve 6A can subsequently be opened from the outside via the wrench mount 6 of the valve 6A, for example, by a diver or a robot-like device, by being pivoted about its rotation axis directed at right angles to the longitudinal axis A by 90° and by the valve releasing the outlet or opening 7.1 in the connection plate 7. The liquid in the tank can subsequently be suctioned out through the device according to the present invention by means of the suction hose.

While specific embodiments of the invention have been shown and described in detail to illustrate the application of the principles of the invention, it will be understood that the invention may be embodied otherwise without departing from such principles.

What is claimed is:

1. An access device for a fluid tank, the access device comprising:
    a connection plate;
    a drill;
    a thread-forming unit connected to the drill;
    a hollow body with an external thread for providing a thread connection together with a thread formed in a wall of the fluid tank by the thread-forming unit, the hollow body being provided with a valve, the hollow body being provided proximally and separate from the thread-forming unit.
2. A device in accordance with claim 1, wherein the drill comprises a diamond drill.
3. A device in accordance with claim 1, wherein the drill comprises a pipe with diamond segments.
4. A device in accordance with claim 3, wherein the pipe comprises steel.
5. A device in accordance with claim 1, wherein the thread-forming unit comprises a support portion and thread-cutting wheels on a circumference of the support portion.
6. A device in accordance with claim 5, wherein the thread-cutting wheels are distributed uniformly over the thread-forming unit support portion.
7. A device in accordance with claim 1, wherein the thread-forming unit comprises a thread-rolling unit with thread-forming wheels comprising thread rollers.
8. A device in accordance with claim 1, wherein a radial distance of a contour of an active area of the thread-forming unit, from a central axis of the device, corresponds to a radius of the external thread of the hollow body.
9. A device in accordance with claim 1, wherein the hollow body comprises a shoulder with a seal.
10. A device in accordance with claim 1, wherein the valve of the hollow body comprises a ball valve.
11. A device in accordance with claim 10, wherein the valve further comprises an operating element on an outer side of the hollow body.
12. A device in accordance with claim 11, wherein the operating element is configured as a triangular wrench mount.
13. A device in accordance with claim 1, wherein the hollow body a lateral opening defining a fluid inlet.
14. A device in accordance with claim 13, wherein:
    the hollow body comprises a shoulder; and
    the lateral opening is arranged distally from a shoulder of the hollow body.
15. An access device for a fluid tank, the access device comprising:
    an access device structure comprising:
        a connection plate located at one end of the access device structure;
        a drill located on another end of the access device structure;
        a thread-forming unit located adjacent to the drill, the thread-forming unit comprising external thread-forming unit threads configured to form one or more wall threads in the wall;
        a valve;
        a hollow body comprising a first hollow body section, a second hollow body section and a hollow body shoulder located between the first hollow body section and the second hollow body section, the first hollow body section being located adjacent to the thread-forming unit, the second hollow body section being located adjacent to the connection plate, the first hollow body section comprising hollow body section threads configured to form a threaded connection with the one or more wall threads in the wall of the fluid tank to connect the hollow body to the wall, the second hollow body comprising an outer surface free of threads, the valve being provided in an interior of the hollow body.
16. A device in accordance with claim 15, wherein the first hollow body section comprises a first diameter, the second hollow body section comprising a second diameter, the first diameter being less than the second diameter.
17. A device in accordance with claim 16, further comprising a seal structure in direct contact with the shoulder and the first hollow body section, the first hollow body section comprising a fluid inlet.
18. A device in accordance with claim 17, wherein the second hollow body section comprises an inner surface defining at least a portion of an interior space of the second hollow body section, at least a portion of the valve being arranged in the interior space.
19. An access device for a fluid tank, the access device comprising:
    a connection plate;
    a drill comprising a drill surface and a longitudinal axis;
    a thread-forming unit comprising a first thread-forming unit surface facing in a direction of the drill and a second thread-forming unit surface, the first thread-forming unit surface being located axially opposite the second thread-forming unit surface with respect to the longitudinal axis, the drill surface facing in a direction of the thread-forming unit, the drill surface being in direct contact with the first thread-forming unit surface;
    a hollow body comprising a hollow body surface located axially opposite the thread-forming unit with respect to the longitudinal axis, the second thread-forming unit surface being located axially opposite the hollow body with respect to the longitudinal axis, the second thread-forming unit surface being in direct contact with the hollow body surface, the hollow body comprising a hollow body outer surface, the hollow body outer surface comprising a hollow body external thread configured to provide a thread connection together with a thread formed in a wall of the fluid tank by the thread-forming unit, the hollow body being provided with a valve.

20. A device in accordance with claim 19, further comprising:
  a seal structure, the hollow body outer surface comprising a first hollow body outer surface extent and a second hollow body outer surface extent, the first hollow body outer surface extent and the second hollow body outer surface extent defining a shoulder located between the first hollow body outer surface extent and the second hollow body outer surface extent, the first hollow body outer surface extent comprising the hollow body external thread, the second hollow body outer surface extent being free of threads, wherein one end of the second hollow body outer surface extent is located adjacent to the connection plate, the seal structure being in direct contact with at least the shoulder.

* * * * *